Patented Sept. 10, 1946

2,407,344

UNITED STATES PATENT OFFICE 2,407,344

CHEMICAL METHODS AND PRODUCTS

Cortes F. Reed, Anoka, Minn., assignor to Charles L. Horn, Minneapolis, Minn.

No Drawing. Original application December 20, 1938, Serial No. 246,901. Divided and this application November 18, 1941, Serial No. 419,658

6 Claims. (Cl. 260—633)

The present invention relates to new methods of reacting gaseous hydrocarbons with halogens and the oxides of sulphur, selenium or tellurium and to new and useful products and intermediate products resulting therefrom.

I have discovered that when an alkene, such as ethylene or propylene is mixed with a halogen such as chlorine and one of the aforementioned oxides, for example sulphur dioxide, that a reaction takes place, and as a result valuable products are produced.

I have discovered further that when a mixture of an oxide of sulphur, tellurium or selenium, a halogen and a gaseous hydrocarbon, for example, ethylene or propylene are passed into a strong acid such as sulphuric or phosphoric, a reaction takes place and valuable products are produced. When using ethylene as the gaseous hydrocarbon along with chlorine and sulphur dioxide in the acid method, ethylene chlorhydrin and ethylene glycol may readily be obtained, and when using propylene, propylene chlorhydrin or glycerine may be obtained.

It is, therefore, a further object of the present invention to provide new methods of producing products from gaseous hydrocarbons, and specifically a new method of reacting upon hydrocarbons with halogens and oxides of the group consisting of sulphur, tellurium and selenium in the presence of an acid.

It is a further object of the invention to provide new methods of making ethylene and propylene chlorhydrin, ethylene glycol and glycerine from, or through the use of ethylene or propylene with sulphur dioxide, chlorine and a strong polybasic mineral acid such as sulphuric or phosphoric acid.

It is a specific object of the invention to provide a process in which ethylene, sulphur dioxide and chlorine are reacted with, and/or associated with acid to cause the production of intermediates which are capable of ready conversion into ethylene chlorhydrin and ethylene glycol.

It is another specific object of the invention to provide a process in which propylene, sulphur dioxide and chlorine are reacted with, and/or associated with acid to cause the production of intermediates which are capable of ready conversion into propylene glycol and glycerine.

It is a further object of the invention to provide a process of recovering the sulphuric acid and by-products of the foregoing processes for reuse in such processes.

It is a further object of the invention to provide a recyclic procedure for reacting upon hydrocarbons. Specifically it is an object to provide a recyclic procedure for produing ethylene glycol from ethylene, sulphur dioxide, chlorine and sulphuric acid, wherein excess of materials or residual products may be purified and/or concentrated and reused in subsequent cycles of the production.

It is also an object to provide a procedure wherein a gaseous hydrocarbon, sulphur dioxide and chlorine is passed through sulphuric acid and the excess passed over to a second and successively to subsequent vessels containing sulphuric acid.

Other and further objects and advantages of the invention are those inherent in the invention hereinafter described, illustrated and claimed.

In carrying out the present invention, I bring together in a reaction vessel the hydrocarbon gas chosen to be reacted upon, the halogen and an oxide of the group consisting of sulphur, tellurium and selenium. I prefer to utilize chlorine as the halogen and sulphur dioxide as the oxide. Furthermore these reactants are cheap, readily available and normally gaseous at the reaction temperatures.

When the three reactants, namely, the hydrocarbon, the halogen and the oxide are brought together a reaction ensues and a desirable product produced which varies according to the conditions of the reaction.

The reaction may be carried out over a fairly wide temperature range. Temperatures from 0° C. to 100° C. represent a practical range, but I prefer that the temperature be maintained at about 30 to 80° C. The temperature used should be insufficient to cause substantial decomposition of the reaction products or reactants.

A wide ratio of ingredients may be used, thus for each volume of halogen vapor I may use from one-half to five volumes of gaseous hydrocarbon and from one to two volumes sulphur dioxide vapor. Where the halogen or oxide is used in other than the gaseous phase, equivalent weight ratios of materials are used.

In some of the procedures of my invention, I disperse the three ingredients into an acid such as phosphoric or sulphuric wherein they react.

For the gaseous hydrocarbon, I may use an unsaturated hydrocarbon of the alkene series such as ethylene, propylene, butene-1 and butene-2. I prefer to use hydrocarbons which are normally gaseous at room temperature, but I do not exclude those which may readily be gasified and maintained gasified by the application of heat.

I may also use the alcohols corresponding to these hydrocarbons, if desired, as hereinafter explained.

According to the acid procedure of the present invention, a gaseous hydrocarbon, a halogen such as chlorine and sulphur dioxide, or the oxide of tellurium or selenium are passed into a concentrated polybasic mineral acid, e. g. sulphuric or phosphoric acid. In general in the acid procedure a hydrocarbon such as ethylene, an oxide such as sulphur dioxide, and a halogen such as chlorine are simultaneously introduced into a body of concentrated sulphuric or phosphoric acid, wherein a reaction takes place with slight evolution of heat. A wide range of ratios of the three reagents may be used. Thus, for each volume of chlorine or other halogen from one-half to five volumes of sulphur or other oxide and from one to two volumes of the gaseous hydrocarbon may be used. The sulphur dioxide and chlorine may be preliminarily mixed and then introduced into the acid along with the ethylene, or the three gases may be introduced concurrently and admixed in the acid by agitation of the latter. For best results it is preferable to agitate the acid medium with, for example, a high speed mechanical stirrer, so as to bring about a fine dispersion of the mixture of gases in the acid. Although not strictly essential, this treatment prevents the development of local heating and brings about best results.

The acid concentration may vary from 93 to 100%, or fuming sulphuric acid (oleum) may be employed. Preferably an acid of a high concentration such as 95% strength sulphuric acid is used. While phosphoric acid may be used, sulphuric acid is preferred. A further advantage is its low cost.

The mechanics of the reaction in acid are not clearly understood. The acid medium either absorbs, carries, or becomes one of the products of reaction of the constituents and gains weight as the reaction proceeds. Thus in a typical run, there is a gain in weight of about 1.6% after 1½ hours; 3½% after 3½ hours, 6% after 6½ hours; 7.4% after 8½ hours; 9.6% after 11½ hours and 14% after 16½ hours, or an average gain of .85% per hour.

Some of the products of the reaction are soluble in or form combinations with the acid, and may be recovered in usable form as pointed out below. In addition, under certain operating conditions an oily layer forms and separates as a layer on the treated acid. This oily layer, which is principally chlorinated products, is removed by any desired separatory procedure.

The formation of the oily layer of chlorinated products may be maintained at a minimum or altogether prevented by suitably regulating the ratio of oxide to halogen, as for example, by regulating the ratio of sulphur dioxide to chlorine where these are used. Thus by using about two volumes of sulphur dioxide, one volume of chlorine and one volume of ethylene gas, substantially no oily layer is produced. A decrease in the quantity of hydrocarbon or oxide, as compared with the halogen, favors the production of the oily layer.

The treatment of the acid with the three reagents may take place in one vessel which is sufficiently large to absorb and/or react with the reagents as they are introduced. Where the reagents are gaseous, any excess of gases not taken up by the acid, may be conducted to a recovery apparatus for reuse, or to a second reaction vessel filled with untreated acid. In some instances where the reagents are all gases it is desirable to provide a series of reaction vessels each containing acid and each provided with an agitator. With such apparatus the three gases are introduced into the first vessel in quantities sufficient that there will be an excess of gases which are not absorbed. These are conducted to the second and the excess from the second, if any, to a third reaction vessel, etc. According to this method the fresh concentrated acid is introduced into the third or last vessel of the series and the charge of acid in each vessel is moved to the next earlier in the series as the treatment proceeds, thus to cause a flow of acid through the treating vessels which is counter to the flow of the three gases as reagents.

After the acid has been treated with the oxide halogen and hydrocarbon, to increase its weight, the acid mixture is heated to a temperature which is preferably not more than 150° C., for about 10 to 15 minutes, preferably under reduced pressure. The length of time during which the heating is continued depends in part upon the temperature at which the gas treatment of the acid was carried out, but little heating being required when an elevated temperature has been maintained during the gas treatment. The effect of the after-heating of the gas treated acid is probably to cause a molecular rearrangement to take place in the compounds existing in or in combination with the acid.

During the after-heating sulphur dioxide is evolved where it is used as one of the reagents. This is preferably collected and used in the treatment of additional acid.

The examples given below are illustrative of the manner of carrying out the present invention. The examples illustrate the hydrocarbons that may be reacted upon, details of the procedures, and the compositions thereby produced but it is to be clearly understood that the examples are not to be considered as limiting the invention.

*Example I*

A five hundred gram mass of 66° Baumé sulphuric acid having a temperature of 25° C. was quickly heated to 50° C., and thereafter maintained at about 50° C. Ethylene, sulphur dioxide and chlorine were introduced into the acid by slowly bubbling the gases into the acid which was maintained in a state of agitation by a rapidly driven mechanical stirrer. The agitation of the acid was sufficient to maintain a fine dispersion of the gases in the liquid. The three gases were introduced at the rate of 100 cc. of each per minute, or in a volumetric ratio of 1 to 1 to 1.

This treatment was continued for a total of eight hours during which time the acid gained a total of 72 grams weight or about 9 grams per hour. The products formed during the reaction remained soluble except at the last part of the treatment, at which time an oily layer of chlorinated products began to separate out.

The treated acid was then placed in a separatory funnel and the oily layer constituent, which amounted to 48 cc., was separated out.

A 300 cc. portion of the treated acid from which the oily layer portion had been removed was then diluted with 250 cc. of distilled water and heated under a reflux condenser for about thirty minutes. The diluted and heat treated acid was then distilled and a 100 cc. fraction collected at from 102° to 106° C. This fraction was a mixture of ethylene chlorhydrin and water. It had a specific gravity of 1.083.

The 100 cc. fraction ethylene chlorhydrin and water was then neutralized and refluxed with 30 grams of soda ash for three hours. The refluxed mass was then concentrated under twenty inches of mercury vacuum to remove water, and the residue taken up with methyl alcohol. After evaporation of the alcohol, 25 cc. of ethylene glycol remained.

Example II

A 600 cc. quantity of sulphuric acid of 66° Baumé concentration was maintained at from 20° to 30° and ethylene, sulphur dioxide and chlorine were introduced into the heated and rapidly stirred acid at the rate of 105 cc., 170–195 cc., and 105 cc. per minute respectively. The introduction of the gases was continued for 7½ hours and the gas treated acid was permitted to stand over night. About 55 cc. (75 grams) of oily liquid separated from the main body of the acid and was removed therefrom. A 300 cc. portion of the treated acid was then heated for a few minutes under a vacuum of about 26" to draw off residual chlorine and sulphur dioxide, and then heated under reflux after dilution with 300 cc. of water. The mass was then distilled and a 200 cc. fraction collected between boiling temperatures of 102° and 105° C. This fraction was a slightly acid mixture of ethylene chlorhydrin and water.

The ethylene chlorhydrin solution was neutralized with sodium hydroxide and saponified or hydrolyzed with sodium carbonate, then concentrated by evaporation under reduced pressure. The residue which contained ethylene glycol and sodium chloride was mixed with methyl alcohol, and the undissolved salt filtered off. The filtrate which contained alcohol and ethylene glycol was then distilled under reduced pressure to remove the methyl alcohol from the residue of 15 grams of ethylene glycol.

Example III

A 500 cc. quantity of concentrated sulphuric acid was heated to 50° C. and ethylene, sulphur dioxide and chlorine were bubbled therethrough in the ratio of one volume of ethylene to 1½ volumes of sulphur dioxide to one volume of chlorine. The chlorine and sulphur dioxide were preliminarily mixed and then introduced along with the ethylene, a mechanical stirrer was suspended in the acid body. The gas treatment of the acid was continued for 8½ hours and the temperature of the acid was maintained at about 50° C. during this itme.

At the end of the treating time 70 cc. of oily product was separated and half of the remainder was treated as in the foregoing example to produce ethylene chlorhydrin and then ethylene glycol. About 20 cc. of the latter was produced. The other half of the remainder was treated the same as in the foregoing example except that the acid was not heated before dilution. The glycol product from the second half was about 10% of that produced with heating before dilution.

Example IV

A 500 cc. quantity of concentrated sulphuric acid was maintained at from 85 to 95° C. and agitated with a mechanical stirrer. During heating and while agitated ethylene, sulphur dioxide and chlorine were bubbled into the acid in the proportions of one volume of ethylene to 1½ volumes of sulphur dioxide to one volume of chlorine. This treatment was continued about 6½ hoours. A 300 cc. portion of the gas treated acid was diluted with 500 cc. of water and distilled. The oily product produced in the gas treatment, which in this case amounted to only 5 cc., was distilled over below 90° C. The fraction distilled over between 102° and 110° C. was a mixture of ethylene chlorhydrin and water.

The ethylene chlorhydrin solution was hydrolyzed with 50 grams soda-ash under reflux and the free acid neutralized with sodium hydroxide. The mass was distilled off under vacuum and the salt filtered off as formed. About 25 cc. of semi-purified glycol was obtained.

Example V

A 500 cc. quantity of concentrated sulphuric acid was maintained at from 65° to 75° C. and agitated as in the previous examples. While agitated ethylene, sulphur dioxide and chlorine were introduced in the ratio of 95 cc. per minute to 162 cc. per minute, 80 cc. per minute respectively over a period of 6½ hours. The thus treated acid was then heated to 100° C. for fifteen minutes under reduced pressure.

A 250 portion of the acid product was diluted with an equal quantity of water, refluxed for ten minutes and then distilled to yield the desired 100 cc. fraction of ethylene chlorhydrin, water mixture which had a specific gravity of 1.05. This was neutralized with 96 cc. of 2/10 normal sodium hydroxide and hydrolyzed with a solution of 25 grams soda-ash in 50 cc. of water, which was added over a period of three hours by means of a dropping funnel. During the hydrolysis the mixture was maintained at a boil under reflux. The resultant product was concentrated under vacuum to remove water and the residue taken up with methyl alcohol in order to separate the sodium chloride formed during neutralization. The alcohol was distilled off and 15 cc. of ethylene glycol was produced.

Another 250 cc. portion of gas treated acid was similarly treated to produce the ethylene chlorhydrin solution, but in this instance hydrolysis was accomplished by boiling under reflux with 25 grams of sodium bicarbonate. The resultant ethylene glycol was purified as before. The yield was 16 cc.

Example VI

A 500 cc. quantity of concentrated sulphuric acid was treated with ethylene, sulphur dioxide and chlorine which were bubbled into the acid at the rates of 100 cc. of ethylene to 118 cc. of sulphur dioxide to 115 cc. of chlorine per minute. During the gas treatment the acid was agitated by stirring, as in the previous examples, and was maintained at from 60° C. to 65° C. and the reaction was carried out in the presence of actinic light. The treatment continued for 7 hours and 83 cc. of oily product was produced and separated.

The gas treated acid was treated as set forth in the foregoing examples to yield the ethylene chlorhydrin and ethylene glycol.

Example VII

The procedure of the preceding example was repeated except that the reaction was carried out at 110° C. and in the absence of actinic light. No oily product was produced. The treatment yielded ethylene chlorhydrin when treated as set forth in the preceding example, and from the chlorhydrin, glycol was produced.

Example VIII

As an illustration of the rate of production of the intermediate products in the acid mass, 907 grams of concentrated sulphuric acid was treated with ethylene, sulphur dioxide and chlorine in the proportion of one volume of ethylene to two volumes of sulphur dioxide to one volume of chlorine. Not all of the gas was absorbed and the excess was permitted to escape. The acid was treated in the presence of a 250 watt lamp and the treatment continued for 16½ hours. The acid was maintained in an agitated condition during treatment by using a mechanical stirrer. The temperature of the acid was 30° C. at the beginning and rose under the influence of the reaction and due to the heat emanated by the lamp, to about 52° C. The acid gained weight according to the following table:

| Hours after treatment began | Gain in weight |
|---|---|
|  | Grams |
| 1½ | 15 |
| 3½ | 32 |
| 6½ | 54 |
| 8½ | 67 |
| 11½ | 87 |
| 16½ | 127 | or an average of 7.7 grams per hour.

The gas treated acid was then heated in a distilling flask and gases totaling 22.5 grams were evolved.

The gas treated acid was then diluted with an equal quantity of water and slightly acid mixture of ethylene chlorhydrin and water was collected as the distillate.

The ethylene chlorhydrin was then neutralized with sodium hydroxide and hydrolyzed with sodium bicarbonate to form ethylene glycol. The yield was about 40 cc. of glycol having a specific gravity of approximately 1.12 at 60° F.

Example IX

As a further example of reaction in acid 347 grams of 90% phosphoric acid were placed in a three neck flask. The flask was provided with a mechanical agitator and with a reflux condenser. Actinic light was supplied by a 250 watt filament lamp and the temperature of the reaction flask was controlled by a water bath which was maintained at 20° C. Into this reaction arrangement gases were introduced as follows: Propylene 88 cc. per minute, sulphur dioxide 118 cc. per minute, and chlorine 92 cc. per minute. The reaction was continued for five and one-half hours during which the phosphoric acid gained 181 grams in weight. At the end of the five and one-half hours the entire reaction mass was transferred to a separating funnel where it separated into two layers. The bottom layer consisted of the acid and products of the reaction dissolved or otherwise incorporated therein. The oily top layer of 100 cc. was refluxed for three hours with 100 cc. of water. 70 cc. of the oily product remained after refluxing. The oil had a density of 1.16 and boiling point of around 95° C., characteristics of dichlor propane.

The phosphoric acid layer was then heated to 150° C. under 27 inches of mercury vacuum, during which a total of 8 grams of gases were removed. The acid was then diluted with an equal proportion of water and distilled. A 100 cc. fraction collected between the boiling points of 102° and 105° C., was hydrolyzed with sodium bicarbonate and then concentrated under reduced pressure until the salt began to crystallize out. The residue was extracted with alcohol and reconcentrated. About 18 cc. of glycerine were obtained.

Ethylene may be reacted with sulphur dioxide and chlorine in the presence of sulphuric acid, in accordance with the foregoing procedures, to produce reaction products which are collected in the sulphuric acid. Upon subsequent heating of the acid, containing such products, a decomposition takes place, liberating hydrochloric acid and sulphur dioxide. A product, vinyl chloride, is formed in the sulphuric acid, but is immediately reacted upon by the sulphuric acid to produce the ester which may then be hydrolyzed with water to form ethylene chlorhydrin.

Various types of apparatus may be used. Any of the non-corrosive materials used for chemical apparatus may be employed. Means for distributing the gases may include porous diaphragms, perforated coils or similar devices, which may be used alone or in conjunction with suitable conventional agitators. Instead of a closed vessel provided with a reflux condenser, a long narrow tube may be used. The tube is preferably a vapor phase reaction zone, but it may be partially filled with a solution of the alkene in a suitable solvent, the chlorine-sulfur dioxide mixture being bubbled through it, or it may be partially filled with the solvent, and a mixture of all these reactants bubbled through. Such reaction tubes can be filled with various inert materials that provide an extensive surface and thus promote reaction between a liquid and a gas, e. g. Raschig rings, broken glass, glass beads, glass rings, platinum gauze, and chains or rings of any inert material. Apparatus and conditions may be so chosen so that the process will be a batch or continuous one, unreacted ingredients being recovered, purified, and recycled, if desired. Recycling, with introduction of additional sulphur dioxide and chlorine as needed, is particularly significant for an economical process and satisfactory over all yield since the yield per pass is usually low.

In any of the foregoing procedures, an alcohol may be substituted for the corresponding hydrocarbon. Thus, normal saturated aliphatic monohydric alcohols having not more than five carbon atoms may be used. For example, I may use ethyl alcohol instead of ethylene, propyl alcohol instead of propylene, butyl alcohol instead of butylene or amyl alcohol instead of amylene in carrying out the invention. In such instances, the alcohol is dissolved in the acid, for example, sulphuric acid and the mixture thus produced is then treated with sulphur dioxide and chlorine. The remaining steps in the procedure are as described above for the several reactions using the various hydrocarbons. Similarly, bromine, fluorine, or iodine vapors may be substituted for the halogen, chlorine, and selenium or tellurium oxides may be used instead of sulphur dioxide.

The concentration of sulphuric or phosphoric acid when used may be increased or decreased as desired although acid of high concentration is preferable. The residual diluted sulphuric acid which remains after removal of the products of this invention may be concentrated and re-used for the formation of further products, in a recyclic procedure.

In several of the examples set forth above the ethylene or propylene chlorhydrin produced has been illustrated as used in the production of specified products, such as ethylene glycol from ethylene chlorhydrin. It is obvious that the chlorhydrins may be used for many other purposes.

This application is a division of my application Serial No. 246,901 filed December 20, 1938.

It will be obvious to those skilled in the art that these and many other modifications may be made in the details of the foregoing procedures without departing from the spirit of the invention.

I claim as my invention:

1. An improved method of reacting upon an alcohol which comprises mixing said alcohol in sulphuric acid and thereafter introducing sulphur dioxide and chlorine into said admixture.

2. An improved process of reacting upon a saturated aliphatic monohydric alcohol having not more than five carbon atoms, which comprises introducing said alcohol into sulphuric acid and thereafter simultaneously introducing sulphur dioxide and chlorine while heating to a temperature of 0° to 100° C., diluting the mass with water after heating and thereafter separating the thus formed reaction products.

3. An improved method reacting upon an alcohol corresponding to a normally gaseous or easily gasifiable olefine which comprises admixing said alcohol, a halogen selected from the group consisting of bromine and chlorine and a dioxide of an element selected from the group consisting of sulphur, tellurium and selenium in the presence of a strong polybasic mineral acid, and thereafter separating the thus formed reaction compounds.

4. An improved method of reacting upon an alcohol corresponding to a normally gaseous or easily gasifiable olefine which comprises admixing said alcohol, chlorine and sulphur dioxide, in the presence of a strong polybasic mineral acid.

5. The method which comprises mixing an alcohol selected from the group consisting of ethyl alcohol, propyl alcohol, butyl alcohol and amyl alcohol, with a concentrated acid selected from the group consisting of sulphuric and phosphoric and thereafter simultaneously introducing sulfur dioxide and chlorine into the mixture until the reaction mass has gained substantially in weight and thereafter separating the reaction products.

6. The method which comprises mixing ethyl alcohol with concentrated sulfuric acid and introducing sulfur dioxide and chlorine thereinto simultaneously.

CORTES F. REED.